United States Patent [19]

D'Alitalia et al.

[11] Patent Number: 5,784,124
[45] Date of Patent: Jul. 21, 1998

[54] SUPRALIMINAL METHOD OF EDUCATION WITH PARTICULAR APPLICATION BEHAVIOR MODIFICATION

[75] Inventors: Joseph Anthony D'Alitalia; Talbert Mead, both of El Paso County, Colo.

[73] Assignee: Advanced Learning Corp., Colorado Springs, Colo.

[21] Appl. No.: 661,943

[22] Filed: Jun. 11, 1996

Related U.S. Application Data

[63] Continuation-in-part of Ser. No. 410,275, Mar. 24, 1995, Pat. No. 5,644,363.

[51] Int. Cl.[6] .................................................. H04N 5/445
[52] U.S. Cl. ........................... 348/564; 348/553; 348/555
[58] Field of Search .................................. 378/563, 564, 378/578, 553, 555, 478, 473

[56] References Cited

U.S. PATENT DOCUMENTS 4,616,261  10/1986  Crawford et al. ..................... 348/564
5,027,208   6/1991  Dwyer, Jr. et al. .................... 348/564
5,221,962   6/1993  Bachas et al. ......................... 348/564
5,270,800  12/1993  Sweet ..................................... 348/564

*Primary Examiner*—Victor R. Kostak
*Attorney, Agent, or Firm*—Steven K. Barton

[57] ABSTRACT

A method of behavior modification involves having a patient view supraliminal video messages superimposed upon an underlying video presentation. The video messages incorporate messages wherein at least some of the messages link a desired modified behavior to positive feelings of the patient. A supraliminal message generator and superimposer iteratively selects individual messages for display from the sequence of messages, decompressing the messages as required, and places the selected messages in a buffer memory of a video generation device. A processor of the supraliminal message generator and superimposer then fades the selected message from an invisible level to a visible level on the video display, and then fades the selected message from the visible level back to the invisible level.

14 Claims, 6 Drawing Sheets

IT'S OK TO BE RELAXED

MY MIND IS RECEPTIVE

MY MIND IS OPEN

CHANGE IS MY FRIEND

I CONTROL MY MIND

I CAN CHANGE MY ATTITUDES

I CAN DO IT

FIG. 1A

I AM A NONSMOKER

I AM A HEALTHY NONSMOKER

I AM A HAPPY NONSMOKER

I FEEL GOOD

I AM A JOYFUL NONSMOKER

I SEE MYSELF HEALTHY

FIG. 1B

CHANGES HAPPEN

I AM SUCCESSFUL

I VISUALIZE MY SUCCESS

HEALTHY CHANGES

HEALTHY LUNGS

I AM SMOKE FREE

SUCCESS

FIG. 1C

I CONTROL MY DIET

MORE EXERCISE

WALKING MAKES ME FEEL GOOD

I CARE FOR MY BODY

MY BODY IS FIT

I VISUALIZE MYSELF EXERCISING MORE

SUPRALIMINAL METHOD OF EDUCATION WITH PARTICULAR APPLICATION BEHAVIOR MODIFICATION

RELATED APPLICATIONS

This application is a continuation in part of co-owned, application Ser. No. 08/410,275, entitled APPARATUS FOR SUPERIMPOSING VISUAL SUBLIMINAL INSTRUCTIONAL MATERIALS ON A VIDEO SIGNAL, filed Mar. 24, 1995 in the name of Talbert Mead. The said application has issued as U.S. Pat. No. 5,644,363.

BACKGROUND OF THE INVENTION

1. Field of the Invention

This invention is a method of behavioral modification or education wherein supraliminal instructional messages containing positive reinforcement are generated synchronous to an underlying television signal, superimposed upon the underlying television signal, and presented to a patient or student.

2. The State of the Art

Systems for generating video subliminal instructional messages and superimposing them upon an underlying video signal have been described. For example, U.S. Pat. No. 5,027,208 presents a system having a 256 by 256 "substitute frame memory" synchronously superimposed upon an underlying video signal by means of a video mixer. While this 256×256 frame memory can display graphic messages as well as text messages, it is 8192 bytes of memory, substantial compared to the total on chip memory of low cost single-chip microprocessors. The device of U.S. Pat. No. 5,027,208 also fails to provide means for on-screen programming.

Similarly, U.S. Pat. No. 5,134,484 presents a method for dynamically decompressing an encoded graphical message and superimposing it on an underlying video signal. While the invention of patent 5,134,484 greatly reduces the required memory size of U.S. Pat. No. 5,027,208, this comes at a cost of extensive logic not found on commercially available microprocessors that support generating synchronized video. Further, no provisions are made for on-screen programming or providing control over the modulation intensity of the subliminal messages.

U.S. Pat. No. 5,221,962 describes a system that provides a manual video modulation-intensity control so that a user may turn up the intensity to consciously observe and validate the correctness of the subliminal message. No on-screen programming of the subliminal message generator is described, nor is any automatic adjustment of modulation intensity.

The afore-described devices purport to educate or modify behavior through subliminal instructional messages presented superimposed upon an unrelated underlying video. Subliminal messages are presented either with very weak modulation, or for extremely short periods of time, to avoid distraction of the conscious mind of the viewer, the patient or student viewing the composite presentation. The intent of subliminal messages is that the subconscious mind, but not the conscious mind, of the viewing patient or student will recognize and be influenced by these messages, leading to behavior modification. To avoid attracting the attention of the viewer's conscious mind, the messages are presented so weakly or for such a brief time that the messages are beneath the threshold of visibility. The word "subliminal" reflects that messages are below the threshold of visibility as sub means below and liminal meaning at the threshold of visibility.

There is evidence that subliminal instruction may be effective. Sally Henry, et al. in _Enhancing Healthcare Education with Accelerated Learning Techniques_, 11 _Journal of Nursing Staff Development_, 1995 no. 1, 21–24, report improved test scores from an educational program incorporating a potpourri of relaxation exercises, music, and subliminal audio messages. Similar results utilizing subliminal messages presented tachitoscopically for two milliseconds, were reported by John Hudesman, et. al. in _Use of Subliminal Stimulation to enhance Learning Mathematics_, 74 _Perceptual and Motor Skills_, 1992, 1219–24. Thinkers in the field recognize that the degree to which messages addressed to the unconscious mind are processed, and thus their effectiveness, "may depend on precisely how the contents in question are rendered unconscious and on the precise details of the task required of the subject." John F. Kihlstrom, et al., _The Psychological Unconscious_, American Psychologist June 1992 788, 790.

Many low cost control-oriented microprocessors now available include a pulse-width modulator. A pulse-width modulator comprises a few stages of latch and counter, thus inherently costs less than the delta-sigma, resistor-string and R-2R ladder digital to analog converters that are known in the art. While a pulse width modulated signal may be used to communicate digital information, pulse width modulated signals are often used to drive electromechanical devices. Pulse-driven motor and lamp drivers can be of much higher efficiency than linear analog drivers, while mechanical, visual, or thermal inertia serves to integrate the mechanical impulses provided by the pulse stream.

A common way of superimposing a color video signal upon a composite video signal involves the steps of 1) demodulating the composite video signal into three pixel color signals Red, Green, and Blue; 2) superimposing the video signal on the pixel color signals by adjusting some or all of the three color signals; and 3) regenerating a second composite video signal from the three adjusted color signals. This technique is expensive in terms of the hardware. Consider the hardware required to demodulate a color signal alone: generally a phase-locked loop regenerates the color subcarrier; a crossover filter separates the chroma information from the luminance information; mixers combine the regenerated color subcarrier with the chroma information, producing baseband color difference signals; and finally the difference signals are combined with the luminance information to produce demodulated red, green, and blue signals.

SUMMARY OF THE INVENTION

It has been found that the human conscious mind is much more sensitive to rapid changes in the visual field than it is to slow changes. Superimposed instructional messages may therefore be hidden from the conscious mind of an accustomed viewer if they are faded into the viewer's visual field slowly, even if the messages become of substantially greater intensity or presentation duration than the intensity and presentation duration of messages associated with traditional subliminal behavioral modification and instructional systems. These messages therefore reach a peak intensity within the range of visibility, hence are not truly subliminal messages, and are referred to as supraliminal messages herein. Indeed, these messages may reach a modulation level in the range of from twenty five to thirty percent of the black to white signal level, with twenty-eight percent preferred, without becoming unduly intrusive, at which level the messages are clearly legible across a room and against a moving background while they may be seen if a viewer looks for them, these messages do not draw the attention of the conscious mind because they are brought into and removed from the viewers visual field slowly. It is expected that supraliminal messages may be better seen by, and may therefore more strongly affect, the human subconscious mind than truly subliminal messages.

The present invention comprises a method of behavior modification wherein a series of supraliminal messages are devised and presented wherein the series of messages is composed of three sections. The first section of the series of messages comprises the idea that the viewer is relaxed, is capable of change, and is in control of life. The second section of the series of messages comprises messages coupling the desired behavior, such as not smoking, with positive experiences for the intended patient, such as feeling joyful, being healthy or happy. The third section of the series of messages comprises messages coupling the desired behavior with the idea of success as well as positive experiences.

Once devised, these messages are sequentially presented to the patient as supraliminal messages. In presenting these supraliminal messages to the patient, the messages are slowly faded from zero intensity to a low but visible intensity on a video display device simultaneously displaying an underlying video signal to the viewer. The message is then slowly removed from the viewer's view.

The invention further comprises a low cost system for generating supraliminal visual messages synchronized to a video signal, and for superimposing those messages through a variable modulation of brightness of an underlying video signal. The supraliminal messages are faded into view gradually to avoid distracting the viewer.

The invention further comprises a combination video generation and superposition hardware that may generate both supraliminal visual messages and messages associated with the on-screen programming of the system. The hardware of the present invention incorporates a pulse-width modulator acting as a digital to analog converter for controlling the intensity of the superimposed supraliminal messages.

The hardware of the present invention permits selective use of full white and/or full black video levels mixed amongst the supraliminal messages. These full video levels are utilized for emphasizing particular messages.

BRIEF DESCRIPTION OF THE DRAWINGS

The best mode presently contemplated for carrying out the invention is illustrated in the accompanying drawings, in which:

FIG. 1A is a sequence of messages similar to those of those supraliminal messages displayed during the first section of the series of messages, illustrating messages conveying the idea that the viewer is relaxed, is capable of change, and is in control of life;

FIG. 1B, a sequence of messages similar to those of the second section of the series of messages for inducing smoking cessation, illustrating messages linking the desired behavior to positive feelings and experiences;

FIG. 1C, a sequence of messages similar to those displayed in the third section of the series of messages displayed in performing the method of the present invention, showing how the desired behavior is linked to the idea of success;

FIG. 1D, a sequence of messages similar to those of the second section of the series of messages for inducing weight loss, illustrating messages linking the desired behaviors of more exercise and less eating to positive feelings and experiences;

DETAILED DESCRIPTION OF THE INVENTION

Figure 1:
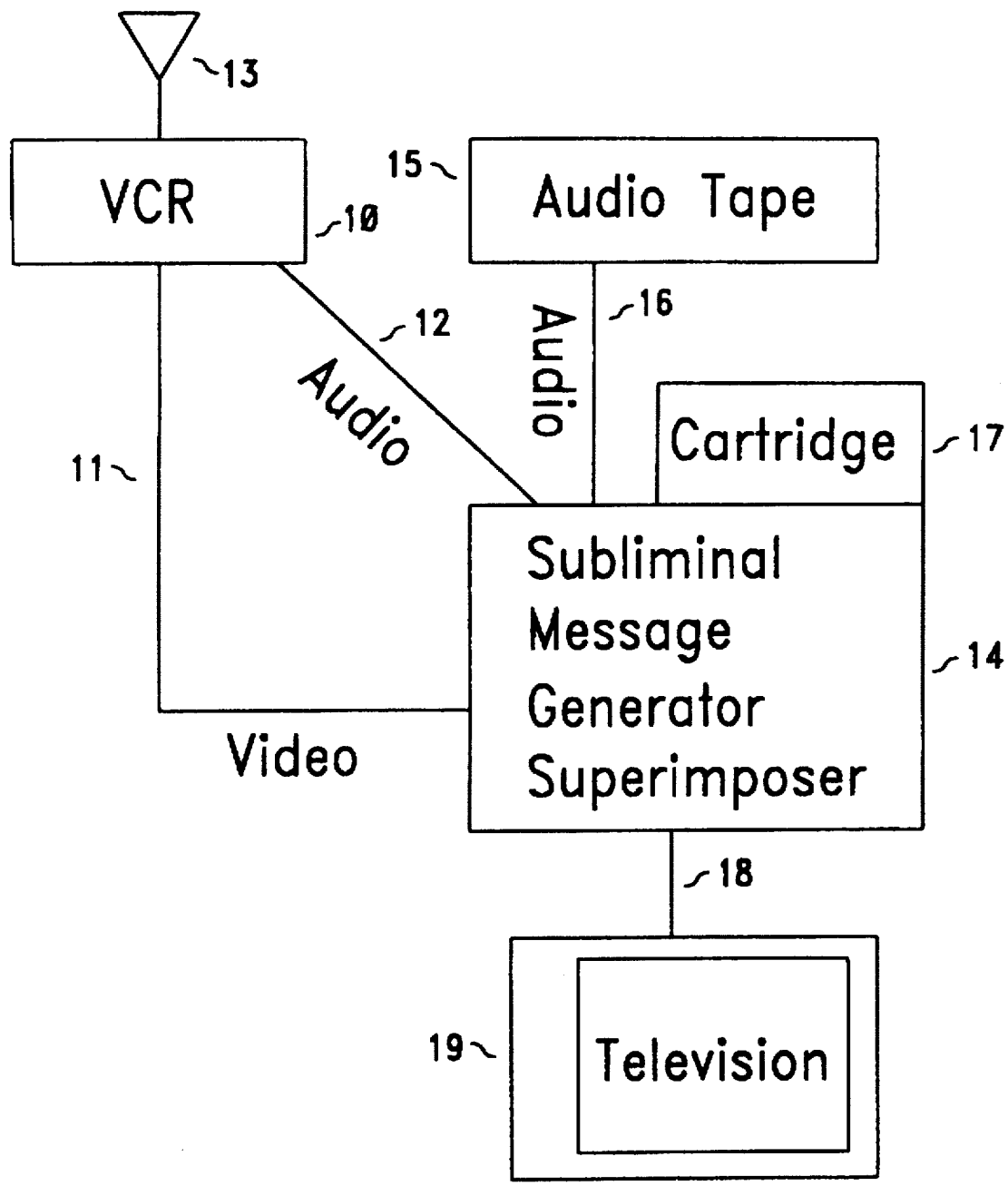
FIG. 1, a system block diagram wherein the device of the present invention superimposes a supraliminal instructional message upon a video signal originating from a videotape recorder and being displayed on a television to a viewing patient.

In carrying out the method of the present invention, a series of supraliminal messages are devised and presented wherein the series of messages is typically comprised of three sections. The first section of the series of messages convey the idea that the viewer is relaxed, is capable of change, and is in control of life, such as those messages illustrated in FIG. 1A. The second section of the series of messages comprises messages, such as those illustrated in FIG. 1B, coupling the desired altered behavior, here not smoking, with positive experiences for the intended patient, such as feeling joyful, being healthy or happy. The third section of the series of messages as illustrated in FIG. 1C comprises messages coupling the desired behavior with the idea of success as well as positive experiences.

It is understood that the method of the present invention has applicability to other behavioral modifications than smoking cessation, for which other messages are appropriate. FIG. 1D illustrates a portion of the second section of a series of messages linking the desired behaviors of eating less and exercising to positive experiences for the viewer. In carrying out the method of the present invention for weight loss, messages similar to those of FIG. 1D are combined with the messages of FIG. 1A and a third sequence of messages linking these behaviors to the idea of success.

Once devised, the messages are compacted and programmed into an electronically readable memory device, located within a program selection key cartridge 17. Compaction is performed by replacing individual words in each message with indexes into a dictionary table. When displayed, the messages are decompressed by reading the indexes, and for each word in the dictionary table, looking up the associated word and copying it into a buffer. Each index in the dictionary table references a character string comprising the full ASCII text of a word of the message.

In the presently preferred embodiment of the present invention, a videocassette recorder 10 (FIG. 1) is used to provide a source video signal 11, and a source audio signal 12. The videocassette recorder may derive this signal by playing a tape, from an antenna 13 by means of an integral tuner (not shown), from a videogame entertainment device (not shown), or from a cable television signal (not shown). The source video signal 11 and the source audio signal 12 are connected to a supraliminal message generator and superimposer 14. The supraliminal message generator and superimposer 14 is normally powered by a separate 12-volt D.C power supply (not shown). It is expected that the source video signal 11 has a signal strength of about 1 V Peak to Peak from synch tip (black level) to white bar; as this is the strength of standard VCR video output signals.

An optional audio tape player 15 generates an optional second audio signal 16 that may also feed the supraliminal message generator and superimposer 14. This second audio signal will be added to the source audio signal 12 to form either an audio output (not shown) or the audio component of an RF-modulated television signal output 18.

The program selection key cartridge 17 containing the compressed messages associating the desired behavior with a positive experience for the viewer is inserted into the supraliminal message generator and superimposer 14. This key cartridge 17 contains information about the nature and sequence of the supraliminal messages to be displayed; one key cartridge may contain messages appropriate for smokers, such as those in FIGS. 1A, 1B, and 1C; another may contain messages appropriate for viewers with weight problems such as those in FIG. 1D. The supraliminal message generator generates and superimposes these messages as supraliminal messages upon the underlying video signal from the VCR 10 to form either a video output or the video component of an RF-modulated television signal output 18. The audio and video outputs, or the RF-modulated television signal 18, connect to a television receiver 19 (FIG. 1) or monitor (not shown) which presents both the underlying source program and the superimposed supraliminal messages to the intended patient (not shown).

Figure 2:
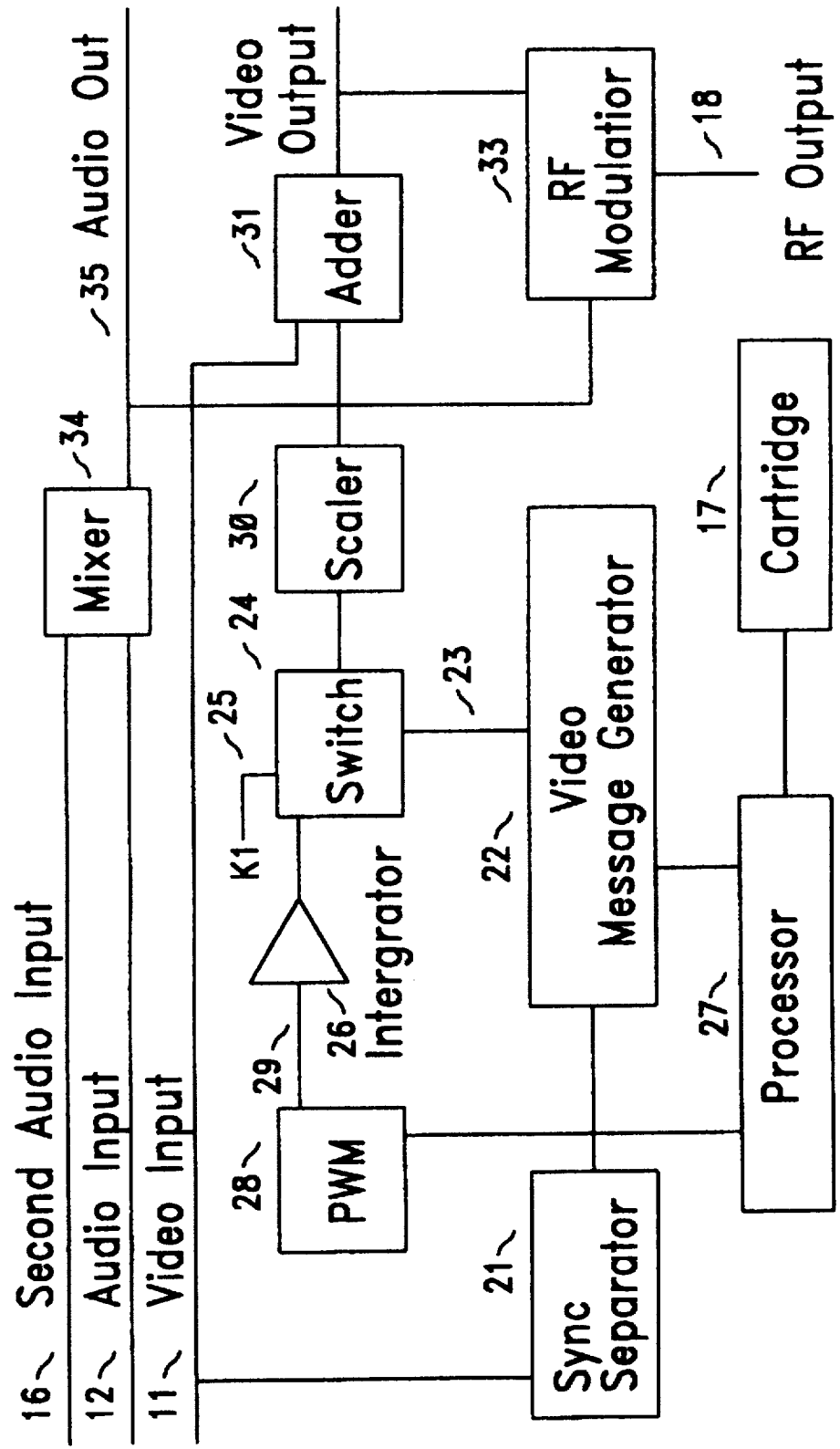
FIG. 2, a block diagram of the supraliminal message generator and superimposer device of the present invention.

FIG. 2 shows more detail of the supraliminal message generator of the present invention. The first video input 11 connects to a synch separator 21 that extracts horizontal and vertical synchronization information from the video signal. This horizontal and vertical synchronization information are used to synchronize a video message generator 22 to the horizontal and vertical scan of the incoming video input signal 11.

The video message generator data output 23 is connected to a control input of a highspeed switch 24. This switch selects either a constant 25 signal or the output of an integrator 26. When the constant 25 is selected the screen intensity of the television 20 will have a first value and when the integrator output is selected the screen intensity will have a second value dependent on the voltage output of the integrator 26. The integrator 26 output is a function of the width of a pulse-width modulated signal 29. A processor 27 drives a pulse-width modulator (PWM) 28 that produces the pulse-width modulated signal 29. The pulse width modulator 28 is controlled by a six-bit width-control value, thereby offering a selection of sixty-four pulse widths each corresponding to an available modulation intensity for supraliminal message display.

It has been found that a modulation intensity, or voltage offset of the underlying video signal by the supraliminal message, of about 10% of the peak to peak video signal level is almost subliminal. It has been found that the modulation intensity can reach the twenty to thirty percent range, with better results in the twenty five to thirty percent range, and with a preferred value of twenty eighty percent, without the message becoming obnoxious. At this level, the messages are clearly legible across a room from a typical television receiver, and are visible against moving backgrounds. Above this level, the messages become sufficiently intrusive as to intrude on the consciousness of, and annoy, typical viewers.

The highspeed switch 24 output is scaled by a scaler 30 and added by an adder 31 to the incoming video signal 11. The output of this adder 31 may be taken as a video output 32 for a monitor, VCR, or other device with a composite video input; or may be fed to an RF modulator 33 to generate a channel 3 or 4 television signal 18. The audio output 12 of the videocassette recorder may be attenuated by an attenuator (not shown) and mixed by a mixer 34 with an optional second audio input 16 to produce an audio output 35. This audio output 35 also serves as an audio input to the RF modulator 33, where the audio information is impressed upon the channel 3 or 4 television signal 18.

The source video signal may comply with the NTSC, SECAM, or PAL standards for composite video. While the presently contemplated initial manufactured version has a separately manufactured device for each of these standards, and for each language in which supraliminal messages are generated, it is expected that later models of the supraliminal message generator will recognize the video standard of the underlying video and automatically configure itself to generate supraliminal messages complying with the appropriate standard. Distinguishing between PAL and NTSC standards may be accomplished through timing the vertical synchronization signal 22 extracted by the synch separator 21; as NTSC video comprises 60 fields per second while PAL comprises 50.

Figure 3:
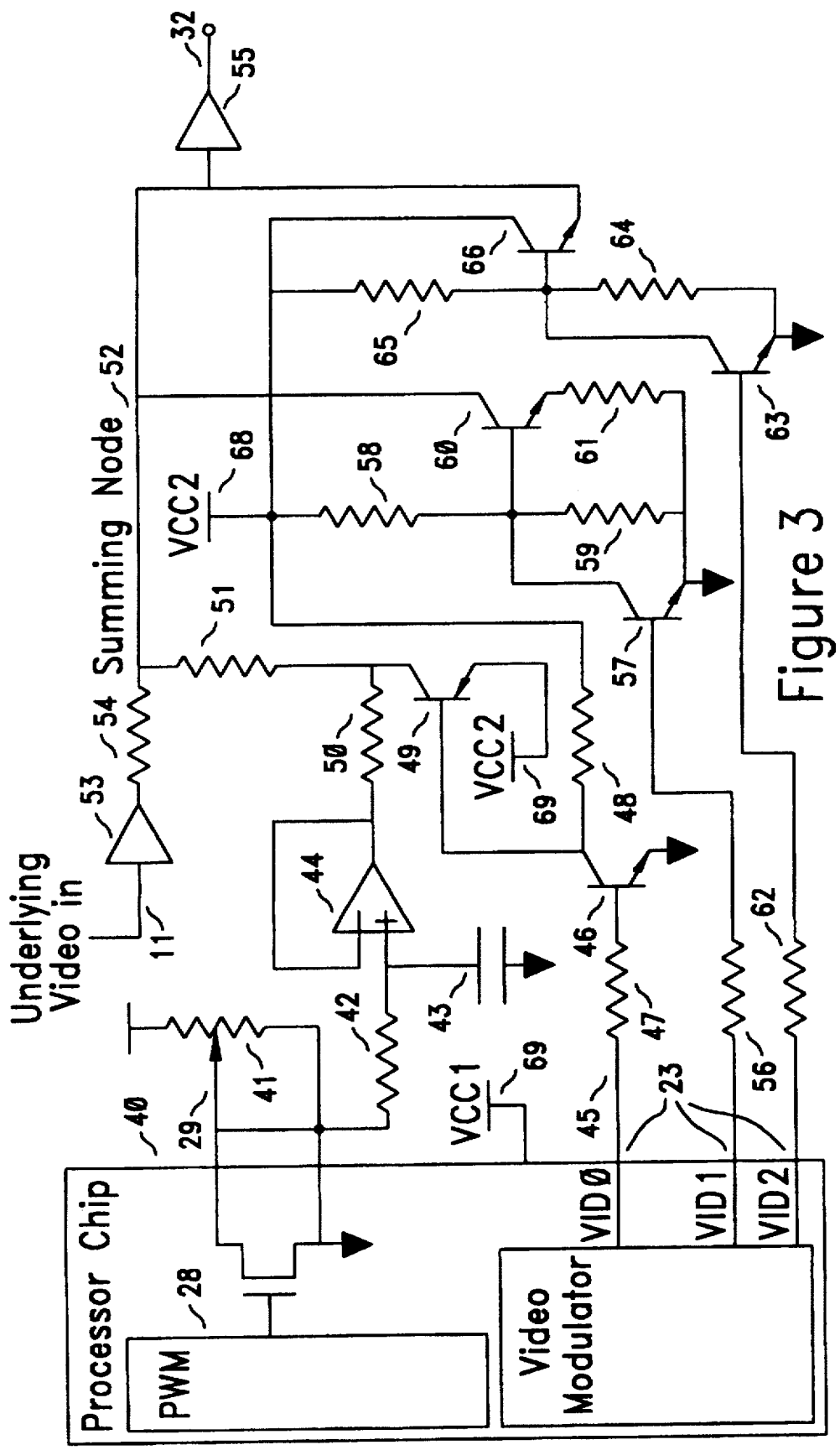
FIG. 3, a circuit diagram of the integrator, switch, scaler, and video adder of the present invention.
Figure 4:
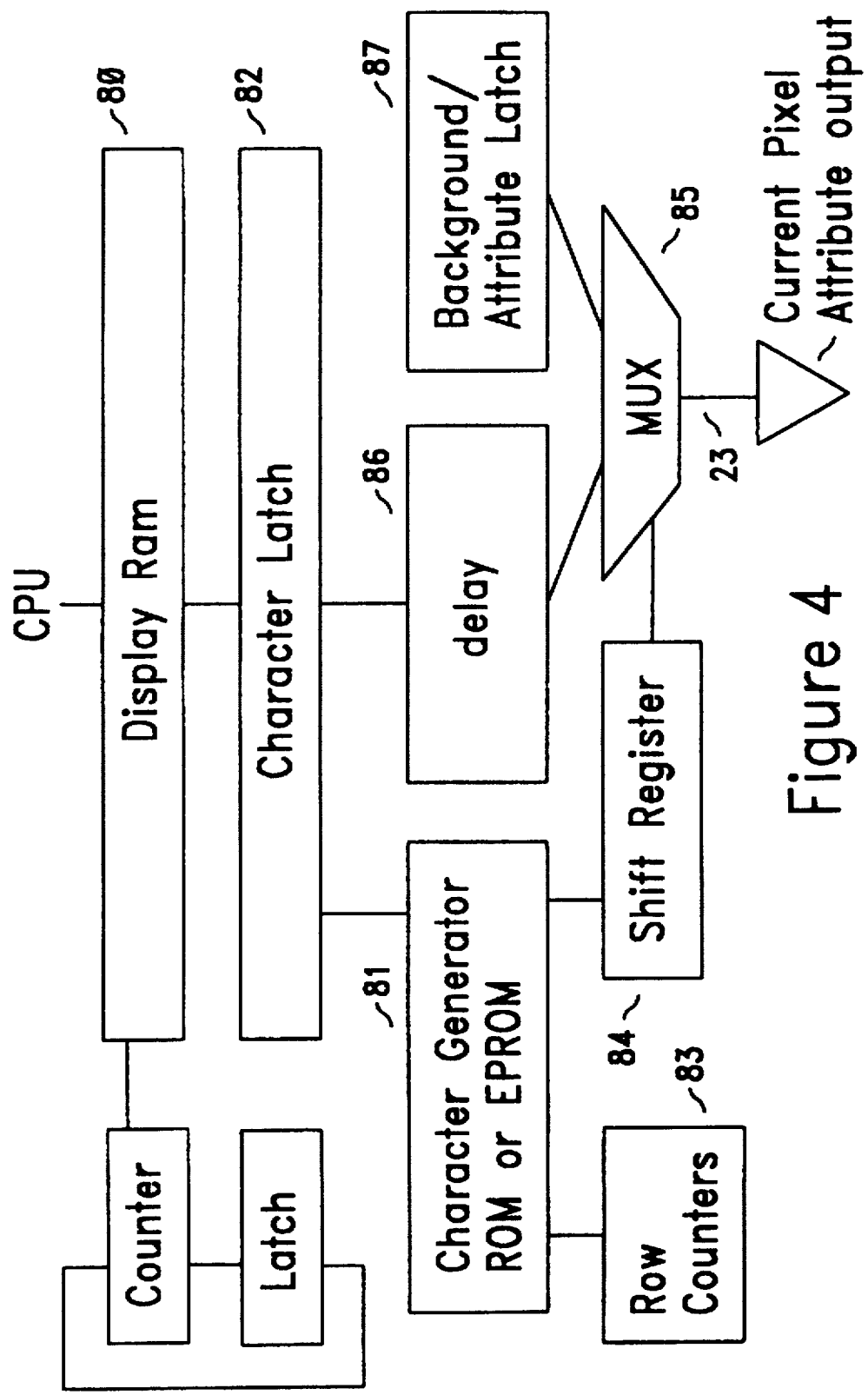
FIG. 4; a block diagram of the video generation portion of the microcontroller used in the supraliminal message generator and superimposer device of the present invention.

Revisiting the present preferred embodiment of the present invention, the pulse width modulator output 29 is available as an open-drain output of the microprocessor chip 40 (FIG. 3 where a potentiometer 41 is used to pull a logic "1" signal to a desired level. A fixed resistor (not shown) may be inserted between this potentiometer 41 and the power supply to prevent destruction of the pulse-width modulator output 29 should the device be turned on with the wiper of potentiometer 41 turned all the way up. This pulse width modulator output is then integrated by a resistor 42 and a capacitor 43, the integral is buffered by an amplifier 44. The output of this amplifier 44 is an analog voltage that corresponds, after delays, to a digital value programmed into the pulse-width modulator 28 by the microprocessor (27 on FIG. 2)

The 87C055 video processor chip used in the presently preferred embodiment has three attribute lines on which the generated video signal 23 appears (FIG. 3), two of which are provided for non-supraliminal video displays used during initialization and on-screen user programming of the system. The third of the generated video lines 23, the line on which supraliminal video appears 45, is inverted and level shifted by transistor 46, resistor 47, and pull-up resistor 48. The inverted signal controls a switch comprising transistor 49 and resistor 50 that applies the buffered integral to an end of the scaling resistor 51, which feeds the summing node 52. It has been found that 10K is a suitable value for the scaling resistor 51. It has also been found that the circuit will provide an inverted but otherwise suitable superposition of the generated supraliminal messages upon the underlying video signal if PNP transistor 49 is substituted with a NPN transistor, the collector-base junction of which acts as a diode to shift down (instead of the normal up) the node between resistors 50 and 51.

The video input signal 11 is buffered by an emitter-follower amplifier 53 and applied through summing resistor 54 to the summing node 52. It has been found that 511 ohms is a suitable value for the summing resistor 54. Other values may be used for the summing resistors 54 and 51, provided that a resistance ratio of about from one to twenty is maintained. The summed video on the summing node 52 is then buffered by an amplifier 55 to generate the video output signal 32. The operation of summing the incoming video with the switched integrator voltage effectively level shifts the underlying video signal by the supraliminal message. If the input signal level is the contemplated one volt signal, this circuitry results in a maximum supraliminal message intensity of about twenty-eight percent of the range between black and white.

The non-supraliminal generated video signals provided for on-screen programming enter the video switch through resistor 62 for light and resistor 56 for dark. Transistors 57 and 60, with resistors 58, 59, and 61, switch a current into summing node 52 when a dark background is desired, and transistors 63 and 66, together with resistors 62, 64, and 65 clamp the summing node 52 to a white level when a white letter or symbol is desired for on-screen programming or initialization displays. It is not necessary that the clamp circuits comprised of transistors 57, 60, 63, 66 and resistors 58, 59, 61, 62, 64, and 65 actually clamp the summing node voltage to a specific value, it is sufficient that they provide sufficient current to overwhelm the input video signal as passed by resistor 54. In addition to supraliminal messages, these clamp circuits allow the hardware of the present invention to be operated to provide dark letters and symbols on a white background, dark letters on an underlying video background, or white letters and symbols on an underlying video background.

The presently preferred embodiment uses two power supply voltages. The primary supply, known as VCC2 68, is approximately 10 volts and regulated down from a 12-volt standard wall-cube power supply. The second supply, VCC1 69, is approximately 5 volts as required for the microprocessor.

It has been found that a microprocessor with video message generator of the Phillips 83C053, 83C054, 83C055 and 87C055 family is suitable for use in the present invention. The 87C055 is preferred for prototype and low volume production, while the mask programmed 83C055 is preferred for higher volume production. In the present preferred embodiment, a device of this family comprises the processor 27, the pulse-width modulator 28, and the video message generator 22 (FIG. 2). The ROM or EPROM memory of the processor contains suitable software that causes the processor 27 to perform the following functions involved in displaying a supraliminal message:

a. Upon power up, the processor 27 must properly initialize the video message generator 22 for the video standard in use (NTSC or PAL are both supported by the 83C054) by the underlying video signal.

b. The system may optionally go through a welcome screen to permit the viewer to set a maximum modulation pulsewidth, corresponding to a maximum modulation level for the supraliminal messages. In the preferred embodiment, the viewer is permitted to select one of fourteen available maximum modulation levels, ranging from a pulsewidth code of five to a pulsewidth of sixty-three (3F Hexadecimal, corresponding to a maximal duty cycle or pulse-width of the pulse width modulator). If the user has failed to select a value, the maximum modulation pulsewidth is set by default to sixty-three, which corresponds to a modulation level of between twenty five and thirty percent, with a preferred target value of twenty-eight percent. The user is also permitted to select a persistence time for the messages from a range of permitted persistence times ranging from three to sixty seconds. If the user fails to select a persistence time, a default level of fifteen seconds is used.

c. The processor 27 sequentially selects an individual message to be generated from the repertoire of messages encoded in the key cartridge. Given sufficient operating time all messages in the repertoire will be selected for display.

d. For each message to be generated, the processor 27 sets the pulse width modulator 28 pulsewidth to zero for minimum modulation intensity, such that the message is initially invisible.

e. The processor reads the key cartridge 17 for information regarding the message to be displayed, decompresses this information, and formats this message in the memory of the video message generator 22. While some components of the messages are stored in the cartridge, a selection of message components such as a part of the dictionary table comprising words that may be used in messages are stored in the ROM or EPROM memory of the processor, the cartridge need then only contain pointers to each of these message components.

f. The pulsewidth of the pulsewidth modulator 28 is ramped, or slowly increased from zero until the desired maximum modulation pulsewidth is reached. The slow increase in pulsewidth involves a change of one step of the sixty-four available pulsewidth steps of the six bit modulator control word approximately once every twentieth of a second; therefore ramping a message to the maximum of sixty-three therefore takes three seconds and ramping a message to the minimum of five takes about a quarter of a second. The slow increase in pulsewidth causes the message to fade into view on the television screen without distracting the viewer.

g. The message is allowed to remain on the screen for a the preselected persistence time in the range of from three to sixty seconds.

h. The pulsewidth of the pulsewidth modulator 28 is slowly ramped decreased to zero to fade out the supraliminal message. The slow decrease in pulsewidth involves a change of one step of the sixty-four available pulsewidth steps of the six bit modulator control word every twentieth of a second; ramping a message from the maximum of sixty-three back to zero therefore takes three seconds and ramping a message from the minimum of five back to zero takes about a quarter of a second.

i. Steps c through h are repeated for each message to be displayed.

The video generation hardware of the 87C054/87C055 family comprises a 128 character display RAM 80 that contains a message to be displayed and four attribute bits for each character. These attribute bits determine a foreground character attribute code in most applications. These attribute codes are referred to as color codes in the 87C054/87C055 documentation. These attribute codes appear during each pixel time as a three bit binary code on the VID0, VID1, and VID2 outputs 23 of the device. The video generation hardware further comprises a character generator EPROM or ROM that contains a pixel pattern for up to sixty letters and symbols that may be displayed.

In operation, a display character and foreground attribute is fetched from the display RAM 80 into a character latch 82. This character, together with a current line count within the present character row (from row counter 83), addresses a word in the character generator EPROM or ROM 81. The character generator word is placed in a parallel-load, serial output, shift register 84 and shifted each pixel time to produce a pixel signal. The pixel signal from the shift register is used to create the 3-bit attribute code output on VID0, VID1, and VID2 23 for each pixel of the generated image through selecting in a multiplexor 85 either the foreground attribute in the character latch 82 (which may be delayed 86 to compensate for the character generator cycle time) or a background attribute in a register 87. In the present preferred embodiment, a VID2-VID1-VID0 code of 111 produces unmodified underlying video, a code of 110 produces underlying video as modified for a pixel of a supraliminal message, a code of 101 produces a dark pixel for non-supraliminal on-screen programming use, and a code of 011 a white pixel for non-supraliminal on-screen programming.

The invention is not limited to use with the messages described herein. The messages illustrated are by way of example, and are but a subset of those used in actual practice.

It is contemplated that instead of sequentially displaying messages from a preset or fixed list of messages comprising a plurality of sections as heretofore disclosed, the invention may also be practiced by having the processor select messages in other ways. For example, the processor could sequence through a series of phases, each phase involving selection and display of some number of messages. While in a given phase the processor would randomly select messages from a group of messages found in the key cartridge that are appropriate for that phase. In the first phase, the processor would randomly select messages related to relaxation, while in a later phase the processor would randomly select messages linking the desired behavior with positive feelings or experiences of the viewer.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A method of modifying human behavior in a human patient comprising the steps of:
   (a) devising a plurality of messages wherein at least some of the messages link a desired modified behavior to positive feelings of the patient;
   (b) having the patient view a video display device portraying an underlying video presentation;
   (c) selecting a message for display from the sequence of messages, and placing the selected message in a buffer memory of a video generation device;
   (d) providing circuitry for superimposing a message generated from the buffer memory of the video generation device onto said underlying video presentation;
   (e) automatically fading the selected message from an invisible level through an intermediate level to a first visible level on the video display device;
   (f) automatically fading the selected message from the first visible level through an intermediate level back to the invisible level on the video display device;
   (g) repeating steps (c), (d), (e) and (f) for other messages from the plurality of messages.

2. The method of claim 1, wherein the sequence of messages further comprises at least one message conveying the idea of relaxation.

3. The method of claim 1, wherein the sequence of messages further comprises at least one message conveying the idea of ability of the human viewer to change his or her behavior and at least one message conveying the idea of relaxation.

4. The method of claim 3, wherein the intensity of the first visible level may be adjusted to a level such that the superimposed message is between about twenty and about thirty percent of the range between a full white level and a full black level of the video display device.

5. The method of claim 4, wherein the intensity of the first visible level may be adjusted to a level such that the superimposed message is between about twenty five and about thirty percent of the range between a full white level and a fall black level of the video display device.

6. The method of claim 4, wherein the intensity of the first visible level may be adjusted to a level such that the superimposed message is about twenty eight percent of the range between a full white level and a full black level of the video display device.

7. The method of claim 1, wherein the message is retained at the first visible level for a time adjustable to a time between three and sixty seconds before being faded back to the invisible level.

8. The method of claim 7, wherein the message is retained at the first visible level for a time of approximately fifteen seconds.

9. The method of claim 1, wherein the messages are stored in a compressed form and wherein the step of placing the message in the buffer memory of a video display device further comprises decompressing the message.

10. An apparatus for presenting supraliminal messages to a patient, the apparatus comprising:
    (a) a removable memory configured to contain a sequence of messages to be displayed, the sequence of messages comprising a plurality of messages linking a desired modified behavior of the patient to positive feelings of the patient;
    (b) apparatus for generating a generated video signal, the generated video signal comprising a message in a buffer memory;
    (c) apparatus for adjusting the intensity of the generated video signal to a level selected from a plurality of possible levels and for combining the generated video signal with an underlying video signal, the possible levels comprising an invisible level, a visible level, and at least one intermediate level between the invisible level and the visible level;
    (d) a processor for successively selecting a message from the sequence of messages, for selecting the level of the apparatus for adjusting the intensity of the generated video signal, and for formatting the message into the buffer memory;
    (e) wherein after formatting a selected message into the buffer memory, the processor adjusts the intensity of the generated video signal from the invisible level through the intermediate level to the visible level over a period of time, thereby fading the intensity of the generated video signal from the invisible level to the visible level, and prior to formatting another message into the buffer memory, the processor adjusts the intensity of the generated video signal from the visible level through the intermediate level to the invisible level over a second period of time, thereby fading the intensity of the generated video signal from the visible level to the invisible level.

11. The apparatus of claim 10, wherein the visible level is a level of between twenty and thirty percent of a range between full black and full white of the video signal.

12. The apparatus of claim 10, further comprising apparatus for automatically recognizing an underlying video signal conforming to a standard selected from the group consisting of the PAL and NTSC standards, and wherein the apparatus for generating a generated video signal is automatically configured to generate a video signal compatible with the underlying video signal.

13. An apparatus for presenting supraliminal messages to a human, the apparatus comprising:
    (a) a removable memory configured to contain a sequence of messages to be displayed, the sequence of messages comprising a plurality of messages linking a desired modified behavior of the patient to positive feelings of the patient;

(b) apparatus for generating a generated video signal, the generated video signal comprising a message in a buffer memory, and for combining the generated video signal with an underlying video signal;

(c) apparatus for recognizing a standard of an underlying video signal, including at least one standard selected from the group consisting of the NTSC and PAL video standards;

(d) a processor for successively selecting a message from the sequence of messages, for configuring the apparatus for generating a video signal to generate a video signal compatible with the standard recognized by the apparatus for recognizing a format, and for formatting the message into the buffer memory.

14. The apparatus of claim 13, wherein after formatting a selected message into the buffer memory, the processor adjusts the intensity of the generated video signal from an invisible level through an intermediate level to a visible level over a period of time, thereby fading the generated video signal from the invisible level to the visible level, and before formatting another message in the buffer memory, the processor adjusts the intensity of the generated video signal from the visible level through the intermediate level to the invisible level over a period of time, thereby fading the intensity of the generated video signal from the visible level to the invisible level.

* * * * *